T (12) United States Patent
Yu et al.

(10) Patent No.: US 10,726,863 B2
(45) Date of Patent: *Jul. 28, 2020

(54) SYSTEM AND METHOD FOR LOCATING MOBILE NOISE SOURCE (71) Applicant: OTOCON INC., Taoyuan (TW)

(72) Inventors: Jen-Fang Yu, Taoyuan (TW); Tung-Hung Sun, Taoyuan (TW); Yen-Sheng Chen, Taoyuan (TW)

(73) Assignee: OTOCON INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,507

(22) Filed: Aug. 21, 2018

(65) Prior Publication Data

US 2018/0358033 A1      Dec. 13, 2018

Related U.S. Application Data

(63) Continuation-in-part of application No. 15/138,641, filed on Apr. 26, 2016, now Pat. No. 10,311,894.

(30) Foreign Application Priority Data

Apr. 27, 2015   (TW) .............................. 104113446 A
Mar. 30, 2018   (TW) .............................. 107111150 A (51) Int. Cl.
*G06K 9/62*        (2006.01)
*G06K 9/00*        (2006.01)
(Continued)

(52) U.S. Cl.
CPC .............. *G10L 25/51* (2013.01); *G06F 16/51* (2019.01); *G06F 16/686* (2019.01);
(Continued)

(58) Field of Classification Search
CPC ........... G06F 17/3028; G06F 17/30752; G06F 16/51; G06F 16/686; G06K 9/6215;
(Continued)

(56) References Cited

U.S. PATENT DOCUMENTS 4,575,829 A * 3/1986 Duhe ..................... G01H 3/125
                                                                    367/117
6,970,102 B2    11/2005 Ciolli
(Continued)

FOREIGN PATENT DOCUMENTS

CA      2949105      11/2015
TW      I307493      3/2009
TW      201038959    11/2010

OTHER PUBLICATIONS

Taiwan Intellectual Property Office, "Office Action", dated Mar. 19, 2019.

*Primary Examiner* — Vivian C Chin
*Assistant Examiner* — Con P Tran
(74) *Attorney, Agent, or Firm* — WPAT, PC (57) ABSTRACT

In a system and a method for locating a mobile noise source, a sound sensing device catches a sound wave of the mobile noise source, and generates and stores a current sound characteristic information corresponding to the sound wave. An image pickup device catches an image of the mobile noise source, and generates and stores an entry of current image data corresponding to the mobile noise source. A spectrogram and image database stores entries of default spectrogram data and entries of default image data. An information processing unit compares the current sound characteristic information with the entries of default spectrogram data, and stores and associates the current sound characteristic information with the mobile noise source in the spectrogram and image database if no similarity between
(Continued)

the current sound characteristic information and the entries of default spectrogram data reaches a preset value.

20 Claims, 8 Drawing Sheets

(51) Int. Cl.
*G06K 9/66* (2006.01)
*G06N 20/00* (2019.01)
*H04N 7/18* (2006.01)
*G10L 25/51* (2013.01)
*G06F 16/51* (2019.01)
*G06F 16/68* (2019.01)
*H04R 29/00* (2006.01)

(52) U.S. Cl.
CPC ........... *G06K 9/6215* (2013.01); *G06N 20/00* (2019.01); *H04N 7/188* (2013.01); *G06K 9/00758* (2013.01); *G06K 9/00771* (2013.01); *G06K 9/66* (2013.01); *G06K 2209/15* (2013.01); *H04R 29/008* (2013.01); *H04R 2201/403* (2013.01)

(58) Field of Classification Search
CPC .. G06K 9/00758; G06K 9/00771; G06K 9/66; G06K 2209/15; G06N 99/005; G06N 20/00; H04N 7/188; H04R 29/008; H04R 2201/403; G10L 25/51
USPC ............... 381/56, 86, 122; 386/224; 725/12; 348/239; 706/12, 11, 25, 911
See application file for complete search history.

(56) References Cited

U.S. PATENT DOCUMENTS

| | | | |
|---|---|---|---|
| 6,997,057 B2* | 2/2006 | Noel | B60R 11/02 181/141 |
| 8,000,897 B2 | 8/2011 | Breed et al. | |
| 8,504,495 B1* | 8/2013 | Baluja | G06N 3/08 706/12 |
| 2006/0253282 A1 | 11/2006 | Schmidt | |
| 2006/0269104 A1* | 11/2006 | Ciolli | G08G 1/04 382/104 |
| 2009/0151837 A1* | 6/2009 | Uhlenbruch | B60C 19/002 152/450 |
| 2009/0285409 A1* | 11/2009 | Yoshizawa | G01S 3/8083 381/92 |
| 2012/0323531 A1* | 12/2012 | Pascu | G01M 13/028 702/184 |
| 2014/0114885 A1* | 4/2014 | Han | G06N 3/0454 706/12 |
| 2016/0277863 A1 | 9/2016 | Cahill et al. | |

* cited by examiner

SYSTEM AND METHOD FOR LOCATING MOBILE NOISE SOURCE

CROSS-REFERENCE TO RELATED APPLICATIONS

The present application is a continuation-in-part application claiming benefit from a U.S. patent application Ser. No. 15/138,641 and filed Apr. 26, 2016, now patented as U.S. Pat. No. 10,311,894, contents of which are incorporated herein for reference.

FIELD OF THE INVENTION

The present disclosure relates to a system and method for locating a mobile noise source, and more particularly to a system and method for locating a noisy vehicle/aircraft or an illegally modified vehicle/aircraft.

BACKGROUND OF THE INVENTION

In consideration of environmental protection issues, noise pollution, just like air pollution, is another problem to face seriously. As known, running vehicles and flying aircraft are major noisy sources in daily lives. It is, however, hard to locate a vehicle or aircraft beyond a statutory noise standard while providing a proof for fining.

SUMMARY OF THE INVENTION

The present application provides a system for locating a mobile noise source, including a sound sensing device, an image pickup device, a spectrogram and image database, and an information processing unit. The sound sensing device catches a sound wave of the mobile noise source passing a specified area within a specified time period, and generates and stores a current sound characteristic information corresponding to the sound wave. The image pickup device catches an image of the mobile noise source, and generates and stores an entry of current image data corresponding to the mobile noise source. The spectrogram and image database storing entries of default spectrogram data and entries of default image data. The information processing unit is in communication with the sound sensing device, the image pickup device and the spectrogram and image database. The information processing unit compares the current sound characteristic information with the entries of default spectrogram data, and stores and associates the current sound characteristic information with the mobile noise source in the spectrogram and image database if no similarity between the current sound characteristic information and the entries of default spectrogram data reaches a preset value.

The present application further provides a system for locating a mobile noise source, including a sound sensing device, an image pickup device, a spectrogram and image database, and an information processing unit. The sound sensing device catches a sound wave of the mobile noise source passing a specified area within a specified time period, and generates and stores a current sound characteristic information corresponding to the sound wave. The image pickup device catches an image of the mobile noise source, and generates and stores an entry of current image data corresponding to the mobile noise source. The spectrogram and image database storing entries of default spectrogram data and entries of default image data. The information processing unit is in communication with the sound sensing device, the image pickup device and the spectrogram and image database. The information processing unit compares the current sound characteristic information with the entries of default spectrogram data. The information processing unit compares a first related information of the mobile noise source obtained by analyzing the entry of current image data with a second related information corresponding to one of the entries of default spectrogram data stored in the spectrogram and image database if a similarity between the current sound characteristic information and the one entry of default spectrogram data reaches a preset value. If the first related information matches the second related information, the current sound characteristic information is stored into the spectrogram and image database and associated with the first related information, or a default sound characteristic information stored in the spectrogram and image database and associated with the second related information is modified according to the current sound characteristic information.

The present application provides a method for locating a mobile noise source. The method includes steps of: catching a sound wave of the mobile noise source passing a specified area within a specified time period, and generating and storing a current sound characteristic information corresponding to the sound wave; catching an image of the mobile noise source, and generating and storing an entry of current image data corresponding to the mobile noise source; and comparing the current sound characteristic information with entries of default spectrogram data stored in a spectrogram and image database, and storing and associating the current sound characteristic information with the mobile noise source in the spectrogram and image database if no similarity between the current sound characteristic information and the entries of default spectrogram data reaches a preset value.

The present application further provides another method for locating a mobile noise source. The method includes steps of: catching a sound wave of the mobile noise source passing a specified area within a specified time period, and generating and storing a current sound characteristic information corresponding to the sound wave; catching an image of the mobile noise source, and generating and storing an entry of current image data corresponding to the mobile sound noise source; and comparing the current sound characteristic information with entries of the default spectrogram data stored in a spectrogram and image database. In the method, if a similarity between the current sound characteristic information and one of the entries of default spectrogram data reaches a preset value, a first related information of the mobile noise source obtained by analyzing the entry of current image data is compared with a second related information corresponding to the one entry of default spectrogram data stored in the spectrogram and image database. If the first related information matches the second related information, the method performs a step of: storing the current sound characteristic information into the spectrogram and image database and associating the current sound characteristic information with the first related information; or modifying a default sound characteristic information stored in the spectrogram and image database and associated with the second related information according to the current sound characteristic information.

BRIEF DESCRIPTION OF THE DRAWINGS

The above objects and advantages of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this application are presented herein for purpose of illustration and description only. It is not intended to be exhaustive or to be limited to the precise form disclosed.

Figure 1A:
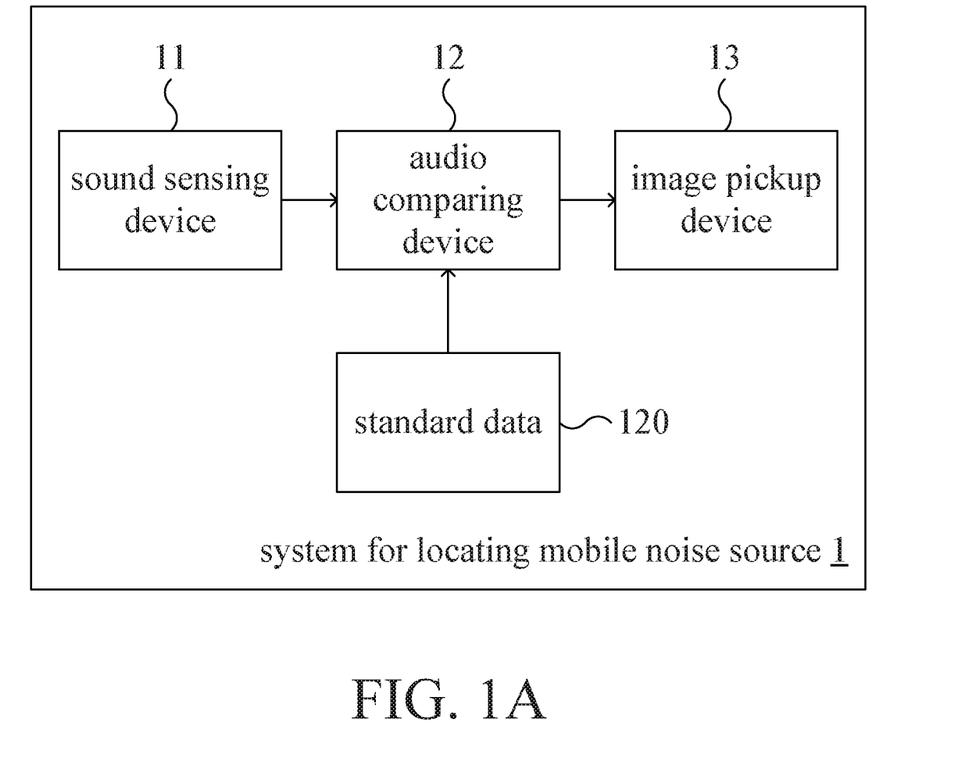
FIG. 1A is a circuit block diagram schematically illustrating a system for locating a mobile noise source according to an embodiment of the present disclosure.

Please refer to FIG. 1, which schematically illustrates a system for locating a mobile noise source according to an embodiment of the present disclosure. The system 1 includes a sound sensing device 11, an audio comparing device 12 and an image pickup device 13. The sound sensing device 11 catches a sound wave of a mobile noise source within a specified area during a specified time period, and outputs a characteristic information corresponding to the sound wave. The audio comparing device 12 in communication with the sound sensing device 11 compares the characteristic information with a set of standard data 120 to obtain a comparison result. If it is determined that the comparison result meets a specified mode (e.g. shows a status to be noted), the audio comparing device 12 outputs an activating signal to trigger an image pickup operation of the image pickup device 13 to catch an image of the mobile noise source passing the specified area. Consequently, an entry of image data is generated and stored.

For example, the mobile noise source may be an automobile, a motorcycle, an aircraft, a boat, a drone or any other running or flying machine that makes noises. The sound sensing device 11 may be a single microphone or a microphone array. The sound sensing device 11 is capable of focusing and sensing sound waves generated by vehicles passing a monitored area, e.g. a specific section of a road, during a monitored period of time, e.g. 5~10 seconds or shorter. The relative distance and angle between different monitored targets and the sound sensing device 11 are fixed in a fixed monitored area (specified area). The sound sensing device 11 transforms the sound wave into a characteristic information. The characteristic information generated corresponding to the sound wave may be a maximum of the sound wave amplitude. For example, a running vehicle with a modified exhaust or a modified engine might make noises bigger than a standard stipulated for such vehicles (e.g. acceptable noise level in pre-delivery inspection) and thus violate rules. With the system according to the present disclosure, the sound sensing device 11 can catch a sound wave of the vehicle to detect the maximal amplitude of the sound wave. Then the audio comparing device 12 compares the maximal amplitude of the sound wave with the set of standard data 120 to determine whether the maximal amplitude of the sound wave exceeds a legally accepted level. If positive, the audio comparing device 12 outputs an activating signal to the image pickup device 13, thereby triggering the image pickup device 13 to pick up the image of the vehicle, and generate and store an entry of image data of the vehicle. The image pickup device 13, for example, may be a digital still camera, a video camera or a combination thereof, and the image data may be a still image, a dynamic video or a combination thereof.

Figure 1B:
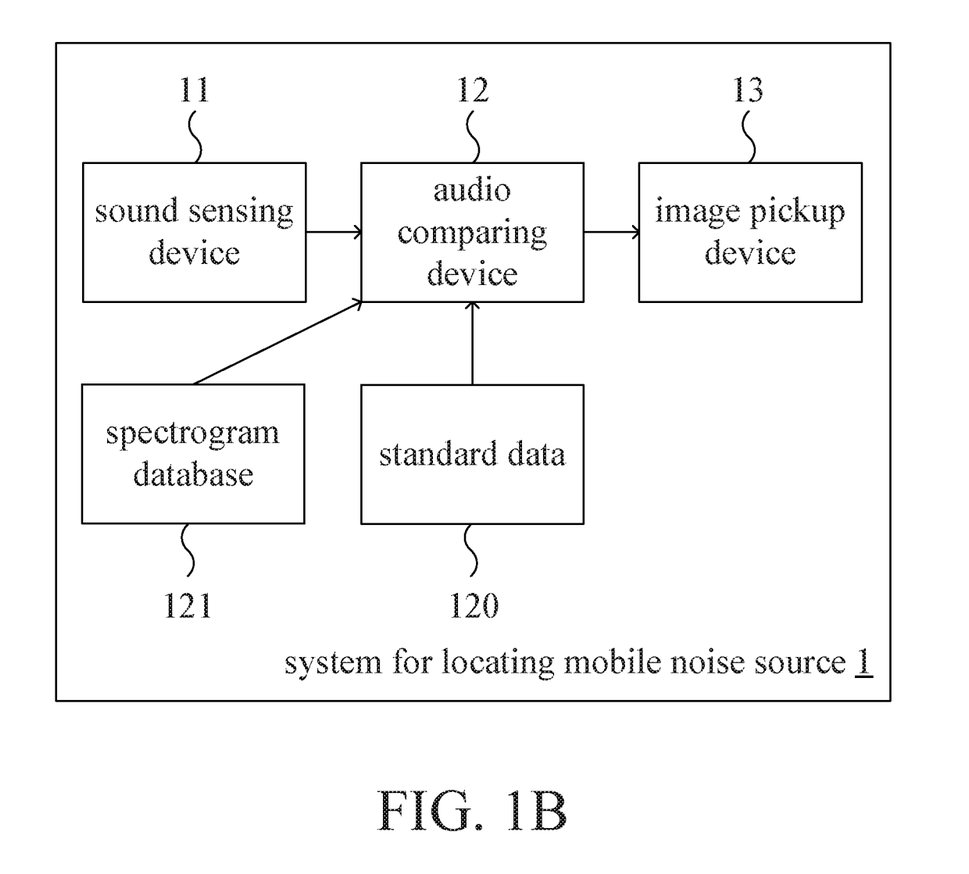
FIG. 1B is a circuit block diagram schematically illustrating a system for locating a mobile noise source according to another embodiment of the present disclosure.

The characteristic information, in addition to being a maximum of a sound wave amplitude or other similar information, may alternatively be spectrogram data (or a sound spectrum data) or a combination of a maximal amplitude of the sound wave and the spectrogram data (or sound spectrum data, applicable throughout the description). In either case, the system 1 further includes a spectrogram database 121 for comparison, as shown in FIG. 1B. The spectrogram database 121 contains entries of default spectrogram data of all the mobile noise sources to be monitored. For example, the spectrogram database 121 is created by collecting and storing default spectrogram data of all types and brands of vehicles obtained from the pre-delivery noise inspection. The sound of a running vehicle with a modified exhaust or a modified engine is different from that before the modification. Entries of default spectrogram data in the spectrogram database 121 are stored in or provided for the audio comparing device 12, e.g. via a network, to be compared with the real-time spectrogram data obtained by the sound sensing device 11. If the spectrogram data of a vehicle does not match any entry of stored default spectrogram data, it is determined that the comparison result meets the specified mode and the monitored vehicle possibly violates rules. Such a vehicle can be located by the present system in a manner as described above. Likewise, the entry of image data of the vehicle passing the specified area can be retained for reporting by the image pickup device 13. Alternatively, a noise level may be detected as an additional parameter for triggering the image pickup device 13. Each entry of spectrogram data is usually huge in data size, and could be compressed to reduce the data size for storage. Alternatively, several characteristics values (e.g. spectral distribution characteristics in specified low frequency band or high frequency band) of each entry of spectrogram data are selected to be stored. Therefore, the spectrogram database 121 with limited size can store more entries of spectrogram data.

Figure 2:
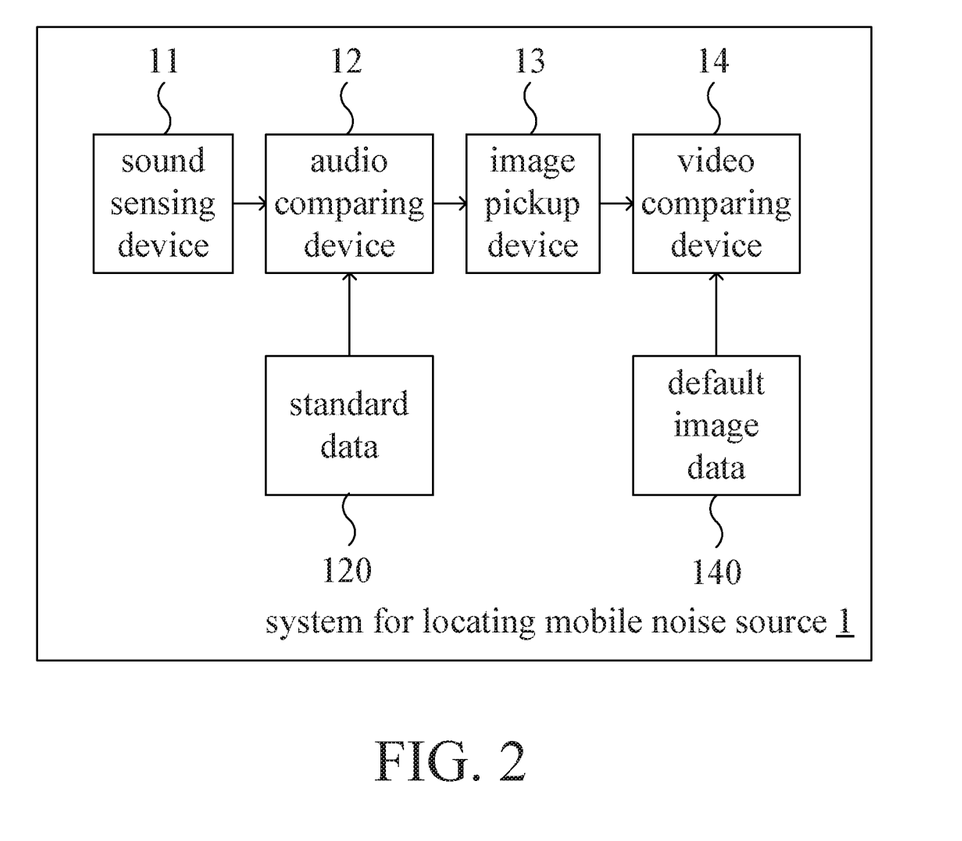
FIG. 2 is a circuit block diagram schematically illustrating a system for locating a mobile noise source according to a further embodiment of the present disclosure.

For reporting, the image data need to include identification data of the vehicle, e.g. license plate number of the vehicle. The license plate number of the vehicle included in the image data can be acquired by automatic image recognition system or visual observation. Then, the identified vehicle is required to go through a compulsory vehicle inspection or the driver of the identified vehicle is fined for unlawful vehicle modification. In another embodiment of the present disclosure, as illustrated in the circuit block diagram of FIG. 2, the system for locating a mobile noise source 1 further includes a video comparing device 14 in communication with the image pickup device 13. The video comparing device 14 pre-stores therein or can access entries of default image data 140, e.g. via a network, for double check. For example, when a vehicle is determined to be a modified vehicle based on the spectrogram data, the entry of image data of the vehicle is transmitted from the image pickup device 13 to the video comparing device 14 to be compared with the entries of default image data 140. The default image data 140 include entire or partial appearances of all the types and brands of vehicles to be monitored. Therefore, the comparison would show whether the appearance of the monitored vehicle changes. Once a mismatching result is realized, a confirming signal is issued, and the report may include the fact of, for example, modification of an exhaust. Since all types and brands of vehicles should be subjected to pre-delivery inspection, the default image data 140 including the appearances of exhausts may be collected and stored during the inspection to create an exhaust database. If the exhaust of a vehicle has been modified, the appearance of the vehicle is probably different from that before the modification. Therefore, the entry of image data of the vehicle is transmitted from the image pickup device 13 to the video comparing device 14 to be compared with the entries of default image data 140. If the entry of image data does not match any entry of default image data 140, the exhaust of the vehicle is probably modified and the video comparing device 14 issues the confirming signal to inform a person in charge or the system to manually or automatically generate a notice, in paper or electronic form, of fine or compulsory vehicle inspection.

Figure 3:
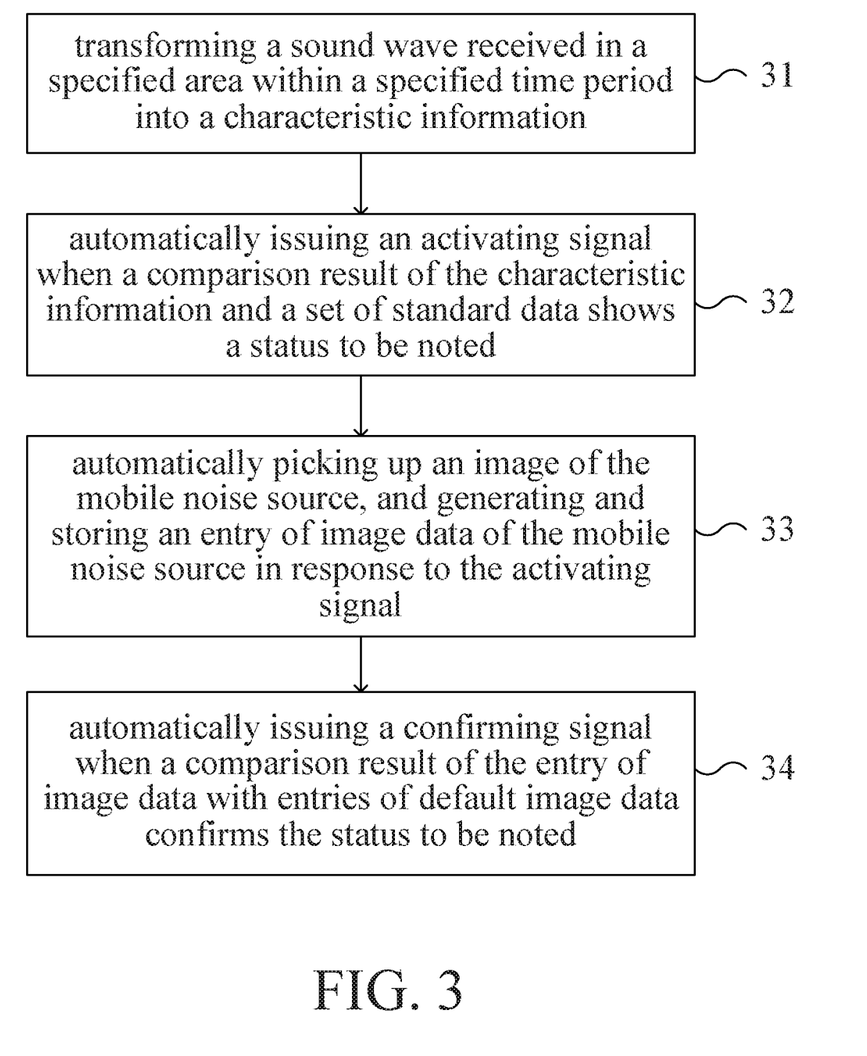
FIG. 3 is a flowchart schematically illustrating a method for locating a mobile noise source according to an embodiment of the present disclosure.

The flowchart of FIG. 3 schematically illustrates a method for locating a mobile noise source according to an embodiment of the present disclosure. The method is adapted to be executed by the above-described system. The method includes steps of: transforming a sound wave received in a specified area within a specified time period into a characteristic information (Step 31); automatically issuing an activating signal when a comparison result of the characteristic information and a set of standard data meets a specified mode or shows a status to be noted (Step 32); automatically picking up an image of the mobile noise source, and generating and storing an entry of image data of the mobile noise source in response to the activating signal (Step 33); and automatically issuing a confirming signal when a comparison result of the entry of image data with entries of default image data confirms the status to be noted (Step 34). In response to the confirming signal, a person in charge or the system manually or automatically generates a notice, in paper or electronic form, of fine or compulsory vehicle inspection. It is to be noted that Step 34 is optional for executing for double check. Of course, Step 34 may also be an essential step when the video comparison is made for a purpose in addition to or other than double check.

Likewise, the mobile noise source, for example, may be a vehicle such as an automobile, a motorcycle, an aircraft, a boat, a drone or any other running or flying machine that makes noises. The transformation of sound waves may be executed by a sound sensing device, e.g. a single microphone or a set of microphones, which may be allocated as an array. The sound sensing device is capable of focusing and sensing sound waves generated by vehicles passing the monitored area, e.g. a specific section of a road, within the monitored period of time, e.g. 5~10 seconds or shorter. The characteristic information generated corresponding to the sound wave may be a maximum of the sound wave amplitude. For example, a running vehicle with a modified exhaust or a modified engine might make noises bigger than a standard stipulated for such vehicles (e.g. acceptable noise level in pre-delivery inspection) and thus violate rules. With the system according to the present disclosure, the sound sensing device can catch the sound wave of the vehicle to detect the maximal amplitude of the sound wave. The audio comparing step may be executed by, for example, an audio comparing device, which compares the maximal amplitude of the sound wave with the set of standard data to determine whether the maximal amplitude of the sound wave is under a legally accepted level. If it exceeds the level, the audio comparing device outputs the activating signal. An image pickup device, when receiving the activating signal, picks up the image of the vehicle, and generates and stores the entry of image data of the vehicle. The image pickup device, for example, may be a digital still camera, a video camera or a combination thereof, and the image data may be a still image, a dynamic video or a combination thereof.

The characteristic information, in addition to being a maximum of a sound wave amplitude, may alternatively be spectrogram data (or a sound spectrum data, applicable throughout the description) or a combination of a maximal amplitude of the sound wave and the spectrogram data. In either case, the set of standard data include a spectrogram database for comparison. The spectrogram database contains entries of default spectrogram data of all the mobile noise sources to be monitored. For example, default spectrogram data of all types and brands of vehicles possibly on the road are stored in or provided for the audio comparing device, e.g. via a network, to be compared with the real-time spectrogram data obtained by the sound sensing device. Since the spectrogram data of a modified vehicle would not match any default one, such a vehicle can be readily located according to the present method in a manner as described above. Likewise, the entry of image data of the vehicle can be retained for reporting by the image pickup device. Alternatively, a noise level may be detected as an additional parameter for triggering the image pickup device.

For reporting, the image data need to include identification data of the vehicle, e.g. license plate number of the vehicle. The license plate number of the vehicle included in the image data can be acquired by automatic image recognition system or visual observation. Then, the identified vehicle is required to go through a compulsory vehicle inspection or the driver of the identified vehicle is fined for unlawful vehicle modification. The optional video comparing step may be executed by, for example, a video comparing device in communication with the image pickup device. The video comparing device pre-stores therein or can access entries of default image data, e.g. via a network, for double check. For example, when a vehicle is determined to be a modified vehicle based on the spectrogram data, the entry of image data of the vehicle is transmitted from the image pickup device to the video comparing device to be compared with the entries of default image data. The default image data include entire or partial appearances of all the types and brands of vehicles to be monitored. Therefore, the comparison would show whether the appearance of the monitored vehicle changes. Once a mismatching result is realized, a confirming signal is issued, and the report may include the fact of, for example, modification of an exhaust. Since all types and brands of vehicles should be subjected to pre-delivery inspection, the default image data including the appearances of exhausts may be collected and stored during the inspection to create an exhaust database. If the exhaust of a vehicle has been modified, the appearance of the vehicle is probably different from that before the modification. Therefore, the entry of image data of the vehicle is transmitted from the image pickup device to the video comparing device to be compared with the entries of default image data. If the entry of image data does not match any entry of default image data, the exhaust of the vehicle is probably modified and the confirming signal is issued to inform a person in charge or the system to manually or automatically generate a notice, in paper or electronic form, of fine or compulsory vehicle inspection.

In the foregoing and following description, the sound characteristic information involved in the comparing step may be in a form of characteristic values, waveform, spectrogram data, sound spectrum data and the like.

Figure 4:
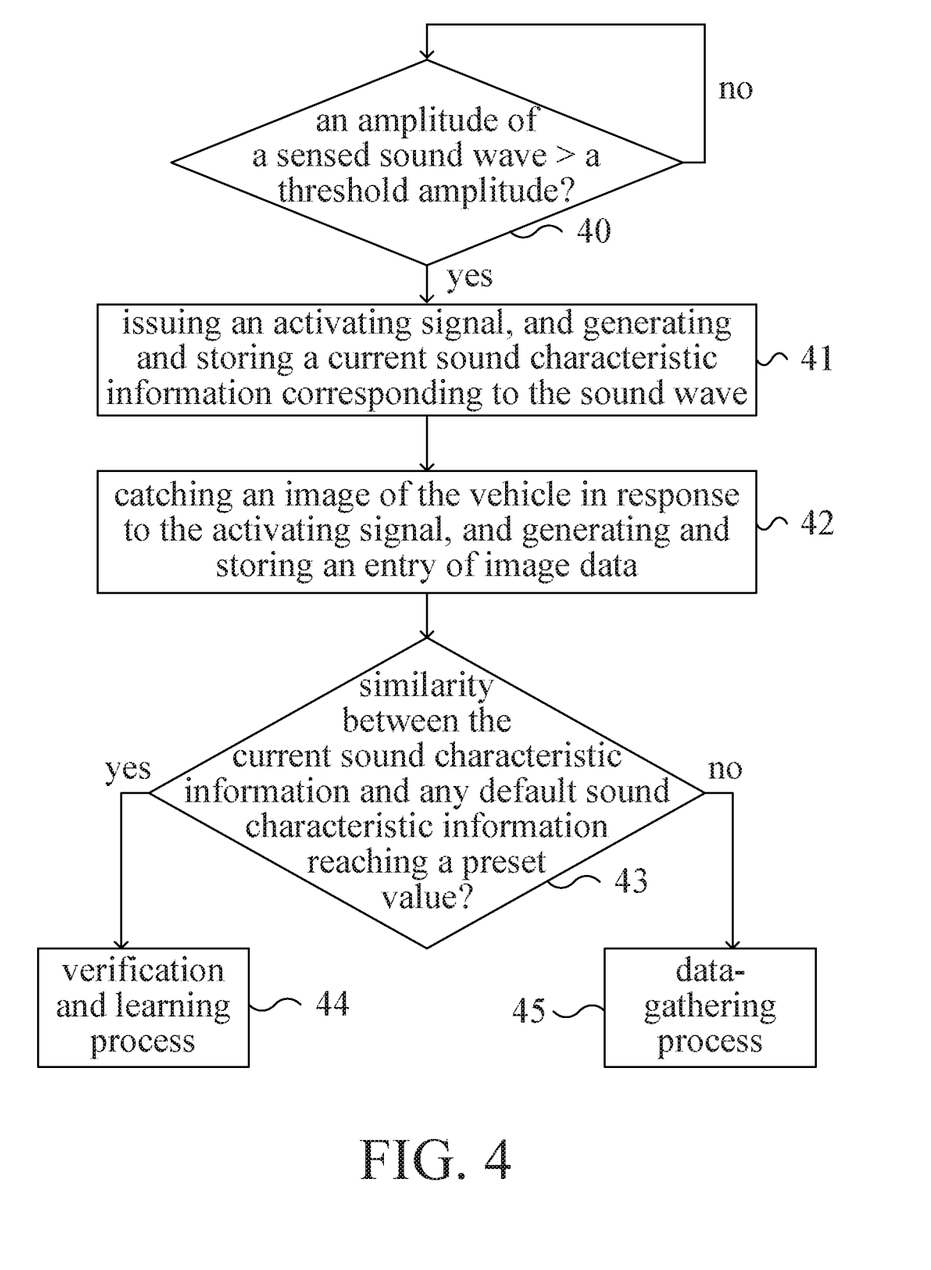
FIG. 4 is a flowchart schematically illustrating a method for locating a mobile noise source according to another embodiment of the present disclosure.

As described, the spectrogram database may be created and expanded during the pre-delivery inspection of vehicles. In addition, the spectrogram data may be automatically expanded by the system and method described as follows. The flowchart of FIG. 4 schematically illustrates a method for locating a mobile noise source according to a further embodiment of the present disclosure. At first, a step of detecting whether an amplitude of a sound wave sensed in a specified area within a specified time period exceeds a threshold amplitude is performed (Step 40). If "no", the detecting step continues. If "yes", an activating signal is automatically issued and the sensed sound wave is transformed to generate a current sound characteristic information and then stored (Step 41). An image of the mobile noise source (vehicle such as an automobile, a motorcycle, an aircraft, a boat, a drone or any other running or flying machine) is automatically captured in response to the activating signal to generate and store an entry of current image data of the vehicle for later comparison (Step 42). The current sound characteristic information is compared with at least a default sound characteristic information stored in the spectrogram database to determine whether a similarity between the current sound characteristic information and any default sound characteristic information stored in the spectrogram database reaches a preset value (e.g. equal to or higher than 95%) (Step 43). If "yes", a verification and learning process is optionally performed (Step 44). If "no" (no similarity reaches the preset value), a data-gathering process is performed (step 45). The threshold amplitude needs not to be equal to the legally accepted noise level. For collecting enough data, the threshold amplitude may be lowered for desired data range.

Figure 5A:
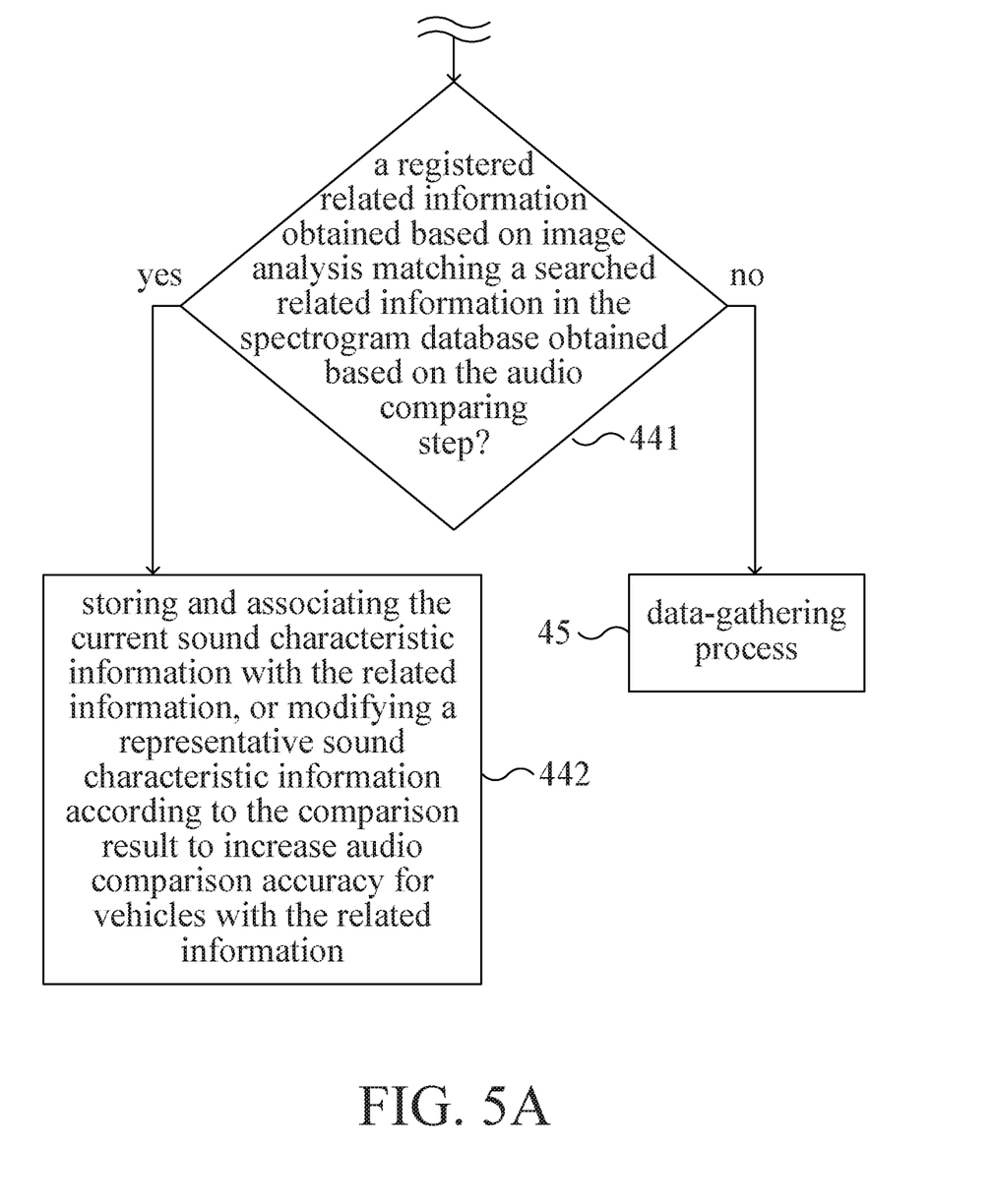
FIG. 5A is a flow chart schematically illustrating the verification and learning process of the method in FIG. 4.

The verification and learning process (Step 44) is shown in FIG. 5A. The verification and learning process includes steps of: acquiring a registered related information (e.g. style or model) of the vehicle in the entry of current image data, searching for a related information (e.g. style or model) associated with the default sound characteristic information stored in the spectrogram database and obtained in the audio comparing step, and determining whether the registered style/model matches the searched style/model (Step 441). If "yes", the style/model is verified, and the current sound characteristic information may be stored in the spectrogram database and associated with the related information (e.g. style or model). Alternatively, a representative sound characteristic information associated with the related information (e.g. style or model) and stored in the spectrogram database is modified according to the comparison result to increase comparison accuracy for all sound characteristic information of the same style/model of the mobile noise source (Step 422). In "no", the style/model is not verified, and the data-gathering process is performed (Step 45).

For example, default sound characteristic information A1, A2, A3 and one representative sound characteristic information AS associated with a specified style of a vehicle have been stored in the spectrogram database before the verification and learning process. A current sound characteristic information A4 obtained in Step 41 may be used to modify the representative sound characteristic information AS so that similarities between the representative sound characteristic information AS and the sound characteristic information A1, A2, A3, A4 are as high as possible (e.g. 97%). Accordingly, as the spectrogram database is expanded, the comparison accuracy is increased.

Figure 5B:
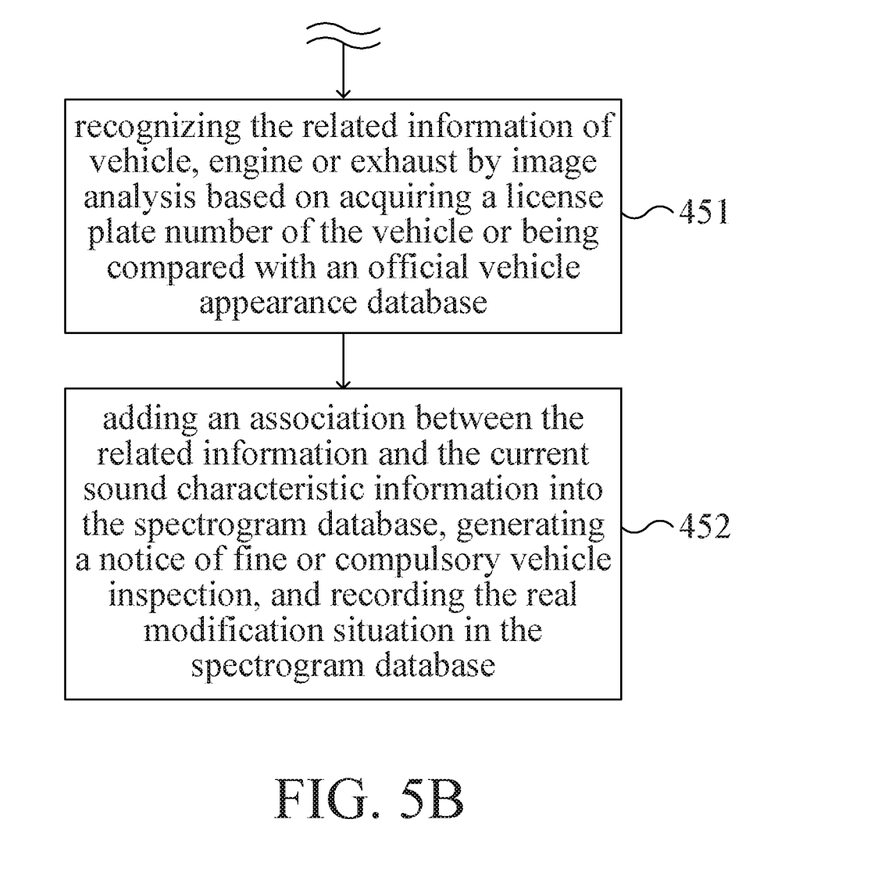
FIG. 5B is a flow chart schematically illustrating the data-gathering process of the method in FIG. 4.

The data-gathering process (Step 45) is shown in FIG. 5B. If the system can not find any default sound characteristic information similar to the current sound characteristic information obtained in Step 41 in the spectrogram database, the current sound characteristic information corresponds to a sound made by an unknown type of vehicle, engine or exhaust. The system recognizes related information (e.g. style or model) of vehicle, engine or exhaust by analyzing the entry of current image data captured by the image pickup device and acquiring the license plate number of the vehicle, or comparing the entry of current image data with an official vehicle appearance database (Step 451). Thus, an association between the related information (e.g. style or model) of the vehicle and the current sound characteristic information can be created and added into the spectrogram database. Then, a person in charge or the system is informed to manually or automatically generate a notice, in paper or electronic form, of fine or compulsory vehicle inspection. Then, the real modification situation of the vehicle is recorded in the spectrogram database and associated with the related information (e.g. style or model) of the vehicle (Step 452). Afterwards, when the same spectrogram data are sensed, the system can realize which style/model of vehicle is illegally modified and should be denounced. The spectrogram database and the official vehicle appearance database can be combined to form a spectrogram and image database. The spectrogram and image database may be provided on a cloud platform for remote access via a network.

For example, a vehicle A with a modified exhaust is passing a specified area, and no data in the database matches the current sound characteristic information caught and transformed by the sound sensing device. After the video comparison, the style/model of the vehicle A is recognized, but the current sound characteristic information is different from the default sound characteristic information associated with the style/model of the vehicle. The vehicle A is considered and recorded as a modified vehicle or marked with suspected modification. The owner of the vehicle A is summoned to confirm the modification situation. If it is found that no modification is ever made to the vehicle A, mechanical failure may happen and affect safe driving or cause air pollution, and the vehicle A is marked with suspected failure. A vehicle inspection may be further performed to find out the problem. The failure information may be associated with the current sound spectrogram data and stored in the spectrogram database. Upon gathering enough data, the present system may further serve as a vehicle diagnosis system to help the factory or customer to detect possible mechanical failure.

The sensing step, comparing step and data-gathering step may be performed locally, e.g. by law enforcement agencies or inspection institutes all over the country or world. The spectrogram database is provided on a cloud platform for remote access from each system for locating a mobile noise source. The audio comparing device of each system according to the present disclosure can access the remote spectrogram database to get original, expanded or updated spectrogram data at any time for comparison to enhance the identification accuracy. With increasing quantity of the spectrogram data in the spectrogram database, the possibility of finding out corresponding data in the database is much higher, so that vehicle with illegal modification or mechanical failure can be easily screened out. In another embodiment, the system checks the style/model of the vehicle by recognizing the license plate number in the captured image data in advance, and then compares the current characteristic information with entries of spectrogram data associated with the style/model to shorten the comparison time and speed comparison.

With increasing quantity of the data in the database, local repetitive comparison with simple algorithm requires huge data transmission from the database on a cloud platform and causes long processing time, Thus, the audio comparing device 12 may be disposed on the cloud platform (not shown) for receiving the spectrogram data and performing the above-described comparison. Since both the audio comparing device 12 and the spectrogram database 121 are disposed in the data center of the cloud platform, only comparison results are transmitted from the cloud platform to local detection spots. Therefore, data transmission is significantly reduced.

Figure 6:
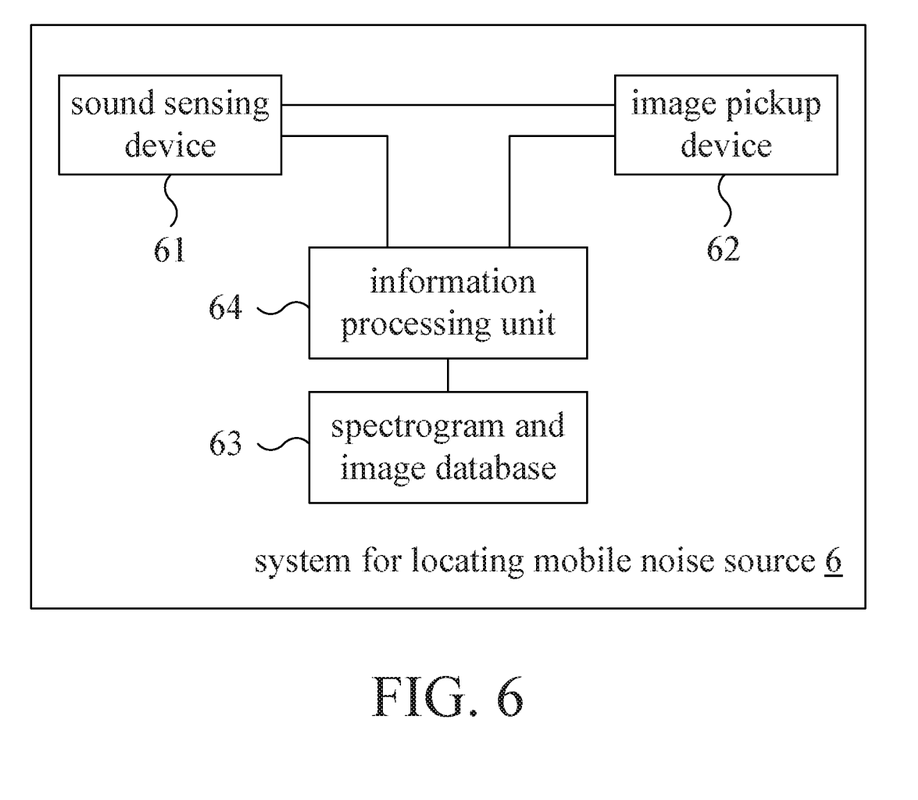
FIG. 6 is a circuit block diagram schematically illustrating a system for locating a mobile noise source according to a further embodiment of the present disclosure.

Please refer to FIG. 6, which schematically illustrates a system for locating a mobile noise source according to a further embodiment of the present disclosure. The system 6 has the function of expanding the database as described above. The system 6 includes a sound sensing device 61, an image pickup device 62, a spectrogram and image database 63 and an information processing unit 64. The sound sensing device 61 catches a sound wave of a mobile noise source in a specified area within a specified time period, generates a current sound characteristic information corresponding to the sound wave (e.g. transforming the sound wave into any know characteristic form) and stores the current sound characteristic information. The image pickup device 62 in communication with the sound sensing device 61 catches an image of the mobile noise source passing the specified area to generate and stores an entry of current image data corresponding to the caught image. The spectrogram and image database 63 stores entries of spectrogram data and entries of image data. The information processing unit 64, in communication with the sound sensing device 61, the image pickup device 62 and the spectrogram and image database 63, compares the current sound characteristic information with the entries of default spectrogram data provided by the spectrogram and image database 63 to obtain a comparison result. If a similarity between the current sound characteristic information and each entry of spectrogram data does not reach a preset value, the information processing unit 64 analyzes the entry of current image data from the image pickup device 62 to acquire related information of the mobile noise source. Thus, an association between the related information of the mobile noise source and the current sound characteristic information is created and added into the spectrogram and image database 63.

According to this concept, law enforcement agencies or inspection institutes all over the country or world can access the up-to-date spectrogram and image database 63 at any time to perform spectrogram comparison. In the verification and learning process shown in FIG. 5A, the default sound characteristic information or default spectrogram data stored in the spectrogram and image database 63 are frequently modified to gradually increase the comparison accuracy. Such learning process may be implemented by artificial intelligence (AI). For example, the entries of default spectrogram data provided by the manufacturers and the entries of spectrogram data associated with vehicle modification are inputted to a machine learning program for deep learning. The machine learning program continues to improve itself for rapidly ad accurately finding abnormal spectrogram data, and determines the style/model, modified parts or faulty parts.

In conclusion, the present system and method can locate and prohibit improper or illegal mobile noise source by comparing characteristic information and automatically capturing image of mobile noise source. Furthermore, modified part or faulty part of the mobile noise source can be automatically detected through sound recognition.

As described above, by way of the system and method according to the present disclosure, a target mobile noise source can be readily located and recorded. Furthermore, modified part or faulty part of the mobile noise source can be automatically detected through sound recognition before mechanical inspection. While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A system for locating a mobile noise source, comprising:
   a sound sensing device catching a sound wave of the mobile noise source passing a specified area within a specified time period, and generating and storing a current sound characteristic information corresponding to the sound wave;
   an image pickup device catching an image of the mobile noise source, and generating and storing an entry of current image data corresponding to the mobile noise source;
   a spectrogram and image database storing a plurality of entries of default spectrogram data and a plurality of entries of default image data; and
   an information processing unit, in communication with the sound sensing device, the image pickup device and the spectrogram and image database, comparing the current sound characteristic information with the plurality of entries of the default spectrogram data, and storing and associating the current sound characteristic information with the mobile noise source in the spectrogram and image database if no similarity between the current sound characteristic information and the plurality of entries of the default spectrogram data reaches a preset value.

2. The system according to claim 1, wherein the information processing unit analyzes the entry of the current image data to recognize a license plate number or compares the entry of the current image data with the plurality of entries of the default image data stored in the spectrogram and image database to find a related information of the mobile noise source before associating the current sound characteristic information with the mobile noise source in the spectrogram and image database.

3. The system according to claim 2, wherein if the related information of the mobile noise source found by the information processing unit does not match a registered information of the mobile noise source, the mobile noise source is marked with suspected modification or suspected failure, an entry of current spectrogram data being stored and associated with a modification information or a failure information in the spectrogram and image database after an inspection of the mobile noise source.

4. The system according to claim 1, wherein if an amplitude of the sound wave sensed in the specified area within the specified time period exceeds a threshold amplitude, the sound sensing device, in communication with the image pickup device, generates and stores the current sound characteristic information corresponding to the sound wave, and triggers the image pickup device to catch the image of the mobile noise source to generate and store the entry of the current image data corresponding to the mobile noise source.

5. The system according to claim 1, wherein the information processing unit compares the current sound characteristic information with the plurality of entries of the default spectrogram data stored in the spectrogram and image database; and compares a first related information of the mobile noise source obtained by analyzing the entry of the current image data with a second related information corresponding to one of the plurality of entries of the default spectrogram data stored in the spectrogram and image database if a similarity between the current sound characteristic information and the one entry of the default spectrogram data reaches the preset value, wherein if the first related information matches the second related information, the second related information is verified, and the current sound characteristic information is stored into the spectrogram and image database and associated with the first related information, or a default sound characteristic information stored in the spectrogram and image database and associated with the second related information is modified according to the current sound characteristic information.

6. A system for locating a mobile noise source, comprising:
a sound sensing device catching a sound wave of the mobile noise source passing a specified area within a specified time period, and generating and storing a current sound characteristic information corresponding to the sound wave;
an image pickup device catching an image of the mobile noise source, and generating and storing an entry of current image data corresponding to the mobile noise source;
a spectrogram and image database storing a plurality of entries of default spectrogram data and a plurality of entries of default image data; and
an information processing unit, in communication with the sound sensing device, the image pickup device and the spectrogram and image database, comparing the current sound characteristic information with the plurality of entries of the default spectrogram data stored in the spectrogram and image database; and comparing a first related information of the mobile noise source obtained by analyzing the entry of the current image data with a second related information corresponding to one of the plurality of entries of the default spectrogram data stored in the spectrogram and image database if a similarity between the current sound characteristic information and the one entry of the default spectrogram data reaches a preset value, wherein if the first related information matches the second related information, the current sound characteristic information is stored into the spectrogram and image database and associated with the first related information, or a default sound characteristic information stored in the spectrogram and image database and associated with the second related information is modified according to the current sound characteristic information.

7. The system according to claim 6, wherein a representative sound characteristic information associated with the second related information in the spectrogram and image database is modified according to the current sound characteristic information if the first related information matches the second related information, so that an average of similarities between the modified representative sound characteristic information and all default sound characteristic information associated with the second related information in the spectrogram and image database is highest.

8. The system according to claim 6, wherein the spectrogram and image database is disposed on a cloud platform to allow a plurality of remote information processing units to access up-to-date default spectrogram data stored in the spectrogram and image database remotely.

9. The system according to claim 6, wherein the information processing unit recognizes a style of the mobile noise source according to the entry of the current image data, and compares the current sound characteristic information with entries of spectrogram data corresponding to the style of the mobile noise source.

10. The system according to claim 6, wherein the information processing unit executes a machine learning program, the plurality of entries of the default spectrogram data stored in the spectrogram and image database and entries of spectrogram data associated with modified mobile noise sources or faulty mobile noise sources being input to the machine learning program for deep learning to assist the machine learning program in determining a style of a target mobile noise source, a modified part or a faulty part in the target mobile noise source.

11. A method for locating a mobile noise source, comprising steps of:
catching a sound wave of the mobile noise source passing a specified area within a specified time period, and generating and storing a current sound characteristic information corresponding to the sound wave;
catching an image of the mobile noise source, and generating and storing an entry of current image data corresponding to the mobile noise source; and
comparing the current sound characteristic information with entries of default spectrogram data stored in a spectrogram and image database, and storing and associating the current sound characteristic information with the mobile noise source in the spectrogram and image database if no similarity between the current sound characteristic information and the entries of the default spectrogram data reaches a preset value.

12. The method according to claim 11, wherein before the step of associating the current sound characteristic information with the mobile noise source in the spectrogram and image database, the method further comprises a step of finding a related information of the mobile noise source by analyzing the entry of the current image data to recognize a license plate number or comparing the entry of the current image data with entries of default image data stored in the spectrogram and image database.

13. The method according to claim 12, wherein if the related information of the mobile noise source does not match a registered information of the mobile noise source, the method further comprises steps of:
marking the mobile noise source with suspected modification or suspected failure; and storing and associating an entry of current spectrogram data with a modification information or a failure information in the spectrogram and image database after an inspection of the mobile noise source.

14. The method according to claim 11, wherein the steps of generating and storing the current sound characteristic information corresponding to the sound wave, and generating and storing the entry of the current image data corresponding to the mobile noise source are performed if an amplitude of the sound wave sensed in the specified area within the specified time period exceeds a threshold amplitude.

15. The method according to claim 11, wherein if a similarity between the current sound characteristic information and one of the entries of the default spectrogram data reaches the preset value during the step of comparing the current sound characteristic information with the entries of the default spectrogram data stored in the spectrogram and image database, the method further comprise steps of:

comparing a first related information of the mobile noise source obtained by analyzing the entry of the current image data with a second related information corresponding to the one entry of the default spectrogram data stored in the spectrogram and image database; and if the first related information matches the second related information to verify the second related information, storing the current sound characteristic information into the spectrogram and image database and associating the current sound characteristic information with the first related information, or modifying a default sound characteristic information stored in the spectrogram and image database and associated with the second related information according to the current sound characteristic information.

16. A method for locating a mobile noise source, comprising steps of:

catching a sound wave of the mobile noise source passing a specified area within a specified time period, and generating and storing a current sound characteristic information corresponding to the sound wave;

catching an image of the mobile noise source, and generating and storing an entry of current image data corresponding to the mobile noise source;

comparing the current sound characteristic information with entries of default spectrogram data stored in a spectrogram and image database;

comparing a first related information of the mobile noise source obtained by analyzing the entry of the current image data with a second related information corresponding to one of the entries of the default spectrogram data stored in the spectrogram and image database if a similarity between the current sound characteristic information and the one entry of the default spectrogram data reaches a preset value; and if the first related information matches the second related information, storing the current sound characteristic information into the spectrogram and image database and associating the current sound characteristic information with the first related information, or modifying a default sound characteristic information stored in the spectrogram and image database and associated with the second related information according to the current sound characteristic information.

17. The method according to claim 16, further comprising a step of modifying a representative sound characteristic information associated with the second related information in the spectrogram and image database according to the current sound characteristic information if the first related information matches the second related information, so that an average of similarities between the modified representative sound characteristic information and all default sound characteristic information associated with the second related information in the spectrogram and image database is highest.

18. The method according to claim 16, wherein the spectrogram and image database is disposed on a cloud platform to allow a plurality of remote information processing units to access up-to-date spectrogram data stored in the spectrogram and image database remotely.

19. The method according to claim 16, wherein after a style of the mobile noise source is recognized according to the entry of the current image data, the method comprising a step of comparing the current sound characteristic information with entries of spectrogram data corresponding to the style of the mobile noise source.

20. The method according to claim 16, further comprising a step of executing a machine learning program, the entries of the default spectrogram data stored in the spectrogram and image database and entries of spectrogram data associated with modified mobile noise sources or faulty mobile noise sources being input to the machine learning program for deep learning to assist the machine learning program in determining a style of a target mobile noise source, a modified part or a faulty part in the target mobile noise source.

* * * * *